United States Patent
Jeong et al.

(10) Patent No.: US 7,489,055 B2
(45) Date of Patent: Feb. 10, 2009

(54) LINEAR MOTOR AND LINEAR COMPRESSOR USING THE SAME

(75) Inventors: Sang-Sub Jeong, Kyungki-do (KR); Hyuk Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 11/260,107

(22) Filed: Oct. 28, 2005

(65) Prior Publication Data

US 2007/0001519 A1 Jan. 4, 2007

(30) Foreign Application Priority Data

Jun. 29, 2005 (KR) ............... 10-2005-0057173

(51) Int. Cl.
*H02K 33/16* (2006.01)
*H02P 7/00* (2006.01)

(52) U.S. Cl. ................ 310/15; 310/12; 417/417

(58) Field of Classification Search .......... 310/12–37; 318/135, 119–134; 417/416, 417, 44.1, 44.11
See application file for complete search history.

(56) References Cited

U.S. PATENT DOCUMENTS

| | | | | |
|---|---|---|---|---|
| 479,948 | A * | 8/1892 | Loomis | 318/122 |
| 4,090,112 | A * | 5/1978 | Selverstone | 318/128 |
| 5,177,423 | A | 1/1993 | Nakamura et al. | |
| 6,783,335 | B2 * | 8/2004 | Chang | 417/417 |
| 2002/0113565 | A1 * | 8/2002 | Kim et al. | 318/556 |
| 2003/0121139 | A1 * | 7/2003 | Katou et al. | 29/596 |
| 2003/0151325 | A1 * | 8/2003 | Bharaj et al. | 310/201 |
| 2004/0108825 | A1 * | 6/2004 | Lee et al. | 318/135 |
| 2004/0178774 | A1 * | 9/2004 | Randall et al. | 322/23 |
| 2004/0245862 | A1 * | 12/2004 | Hong et al. | 310/12 |
| 2004/0245863 | A1 * | 12/2004 | Hong et al. | 310/14 |
| 2005/0093393 | A1 * | 5/2005 | Hirzel | 310/268 |
| 2005/0152788 | A1 * | 7/2005 | Hong et al. | 417/45 |
| 2005/0189824 | A1 * | 9/2005 | Jeong et al. | 310/15 |
| 2007/0001519 | A1 * | 1/2007 | Jeong et al. | 310/12 |

FOREIGN PATENT DOCUMENTS

| | | | |
|---|---|---|---|
| DE | 1763720 | | 12/1971 |
| EP | 1 538 732 A2 | | 6/2005 |
| JP | 07264789 A | * | 10/1995 |
| JP | 08-223897 | * | 8/1996 |
| JP | 10-61559 | * | 3/1998 |
| WO | WO-2004/057739 A1 | | 7/2004 |

* cited by examiner

*Primary Examiner*—Karl I Tamai
(74) *Attorney, Agent, or Firm*—Birch, Stewart, Kolasch & Birch, LLP

(57) ABSTRACT

Disclosed herein is a linear motor in which a plurality of coil groups are connected in series or in parallel and driving power is applied to part or all of the coil groups according to load applied to the linear motor, thereby achieving improved motor efficiency with a reduced motor size. The linear motor includes a bobbin, the plurality of coil groups wound on the bobbin, the plurality of coil groups being connected in series or in parallel to allow the driving power to be applied to part or all of the coil groups, and a magnet adapted to be linearly reciprocated by a magnetic field produced by the coil groups depending on load current flowing through the coil groups. As a result of connecting the plurality of coil groups, which are formed of a plurality of coil conductors, in series or in parallel, the capacity of the coil groups is variable depending on the load of the motor, resulting in improved motor efficiency. Also, using the coil conductors having a small cross sectional area enables reduction in the size of the motor.

10 Claims, 4 Drawing Sheets

(a)  (b)

LINEAR MOTOR AND LINEAR COMPRESSOR USING THE SAME

BACKGROUND OF THE INVENTION

1. Field of the Invention

The present invention relates to a linear motor and a linear compressor using the same, and, more particularly, to a linear motor and a linear compressor using the same wherein a plurality of coil groups, provided in the linear motor, are connected in series or in parallel, and driving power is applied to part or all of the coil groups depending on the magnitude of load current applied to the linear motor, whereby the linear motor achieves an improved efficiency with a reduced size.

2. Description of the Related Art

Generally, a compressor is an apparatus to compress fluid, such as air or gaseous refrigerant. In particular, a linear compressor is designed to introduce, compress, and discharge gaseous refrigerant through a linear reciprocating movement of a piston in a cylinder, which is performed by a linear driving force of a linear motor.

Conventionally, the linear compressor comprises a hermetic container having a suction pipe that is connected to a certain location of the hermetic container to introduce refrigerant into the hermetic container, a cylinder mounted in the hermetic container and having a refrigerant compression chamber therein, a piston mounted to be linearly reciprocated in the cylinder and adapted to introduce the refrigerant into the compression chamber to thereby compress it therein, and a linear motor connected to an end of the piston to provide a driving force required to linearly reciprocate the piston.

The linear motor includes a stator having a coil assembly, and a mover having a magnet and a magnet frame to connect the magnet to the piston.

FIG. 1 is a circuit diagram of a conventional linear motor provided in a linear compressor.

As shown in FIG. 1, the conventional linear motor 1 includes a coil assembly 2 to produce a magnetic field when AC power is applied thereto, and a relay 5 to selectively transmit the AC power to the coil assembly 2.

The linear motor 1 is designed to vary the magnitude of a magnetic field depending on a load applied thereto, thereby achieving improved motor efficiency.

For this, the coil assembly 2, provided in the linear motor 1, consists of a main coil Cm and an auxiliary coil Cs. When the applied load is high, the linear motor 1 operates in a power mode wherein the relay 5 is connected to a connecting terminal 3 of the main coil Cm to increase the magnitude of electric current flowing into the main coil Cm. This increases the strength of the resulting magnetic field, achieving a lengthened stoke of a piston.

Conversely, when the applied load is low, the linear motor 1 operates in a save mode wherein the relay 5 is connected to a connecting terminal 4 of the main coil Cm and the auxiliary coil Cs to decrease the magnitude of electric current flowing into both the main coil Cm and the auxiliary coil Cs. This decreases the strength of the resulting magnetic field, achieving a shortened stoke of the piston.

FIG. 2 is a diagram illustrating the coil assembly of the conventional linear motor.

The coil assembly 2 includes a bobbin, and coils wound plural turns on the bobbin and adapted to produce a magnetic field when electric voltage is applied thereto.

As described above, the coils include the main coil Cm immediately disposed on the bobbin, and the auxiliary coil Cs disposed around the main coil Cm. The main coil Cm and the auxiliary coil Cs are connected in series.

However, the conventional linear motor configured and operated as stated above has a problem in that the size of the linear motor should be large to ensure successful operation of the liner motor in the low-load save mode.

Specifically, since the coils are conductive wires, such as copper wires, they basically have a predetermined magnitude of resistance. Generally, the resistance of a conductive wire is proportional to the length of the wire and inversely proportional to the cross sectional area of the wire.

Therefore, in the case of the save mode wherein driving power is applied to both the main coil Cm and the auxiliary coil Cs connected in series, the resistance of the wire increases due to the increased coil length, and consequently, the electricity consumption of the wire itself increases, resulting in deteriorated motor efficiency.

To solve the above problem, it may be regarded that a conducting wire having a large cross sectional area is used to reduce the resistance of the save mode to a level of the power mode. This solution is effective to improve the efficiency of the motor, but is still problematic because it unnecessarily increases the cross sectional area of the coil in the case of the low-load save mode, resulting in an increased motor size.

In particular, the linear motor is configured in such a fashion that the conductive wires (hereinafter, referred to as coil conductors) of the main and auxiliary coils are closely wound on the bobbin to be stacked one above another. However, if the cross sectional areas of the coil conductors increase, it is very difficult to wind the coils in the above manner.

SUMMARY OF THE INVENTION

Therefore, the present invention has been made in view of the above problems, and it is an object of the present invention to provide a linear motor and a linear compressor using the same, in which a plurality of coil groups, provided in the linear motor, are connected in series or in parallel, and driving power is applied to part or all of the coil groups depending on the magnitude of load current applied to the linear motor, whereby the linear motor achieves improved efficiency with a reduced size.

It is another object of the present invention to provide a linear motor and a linear compressor using the same, wherein a plurality of coil conductors are used to form coil groups of the linear motor, whereby a manufacturing process of the linear motor can be considerably simplified as compared to a conventional method of winding coil conductors each having a large cross sectional area on a bobbin.

In accordance with a first aspect of the present invention, the above and other objects can be accomplished by the provision of a linear motor comprising: a bobbin; a plurality of coil groups wound on the bobbin and connected to each other in series or in parallel to allow driving power to be applied to part or all of the coil groups; and a magnet adapted to be linearly reciprocated under the influence of a magnetic field that is produced by the coil groups depending on load current flowing through the coil groups.

Preferably, the coil groups may include first and second coil groups each consisting of one or more coils stacked one above another on the bobbin.

Preferably, the first and second coil groups may have first and second main coils immediately disposed on the bobbin, and first and second auxiliary coils disposed around the first and second main coils, the first and second main coils may be connected to each other in parallel, and the first and second main coils may be twisted together prior to being wound on the bobbin.

In accordance with a first aspect of the present invention, the above and other objects can be accomplished by the provision of a linear compressor comprising: a cylinder block having a cylinder; a back cover spaced apart from the cylinder block and having a refrigerant suction channel; an outer core disposed between the cylinder block and the back cover; a coil assembly mounted in the outer core and including a plurality of coil groups that are connected to each other in series or in parallel to allow driving power to be selectively applied thereto depending on the magnitude of load current; an inner core spaced apart from the outer core; a magnet located between the outer core and the inner core and adapted to be linearly reciprocated under the influence of a magnetic field that is produced by the coil assembly; a piston connected to the magnet to be linearly reciprocated in the cylinder and having a refrigerant passage formed therein; a suction valve mounted to the piston to open or close the refrigerant passage; and a discharge valve mounted to the cylinder block to open or close the cylinder.

With the linear motor and the linear compressor using the same according to the present invention configured as stated above, a plurality of coil conductors are wound to form a plurality of coil groups and the plurality of coil groups are connected in series or in parallel, so that the capacity of the coils is variable depending on a load applied to the linear motor. This effectively improves the efficiency of the linear motor. Also, using the coil conductors having a small cross sectional area enables reduction in the size of the linear motor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of a linear motor and a linear compressor using the same according to the present invention will be described with reference to the accompanying drawings.

For reference, there may be provided several preferred embodiments of the linear motor and the linear compressor according to the present invention, and hereinafter, the most preferred embodiment will be explained.

Figure 1:
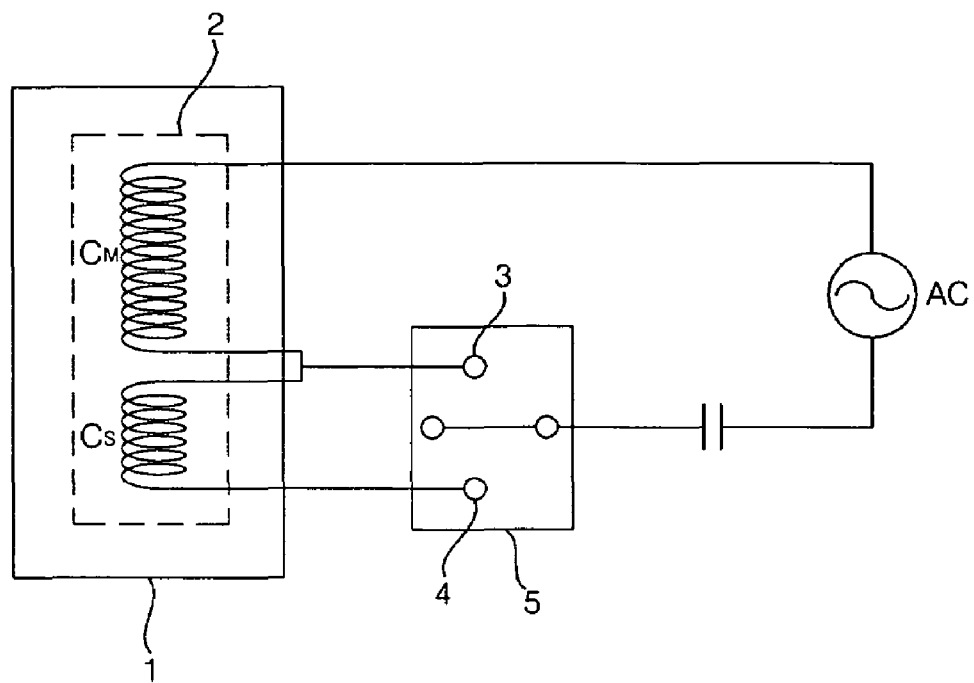
FIG. 1 is a circuit diagram of a conventional linear motor.
Figure 2:
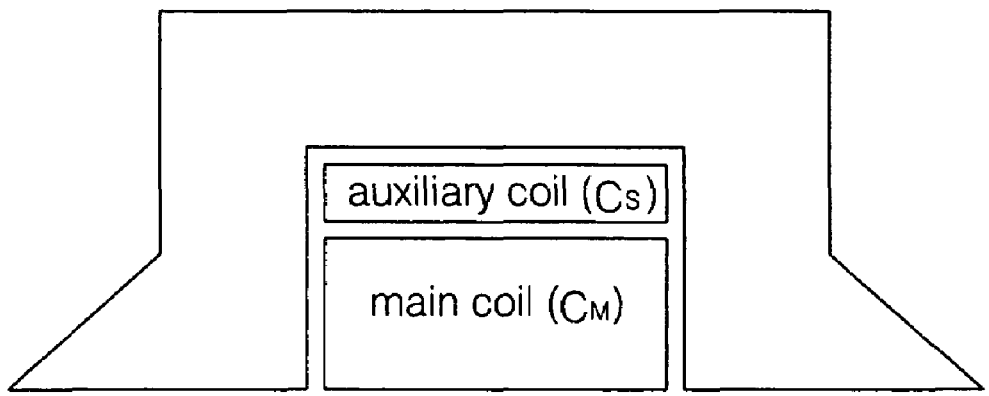
FIG. 2 is a schematic diagram illustrating a coil assembly of the conventional linear motor.
Figure 3:
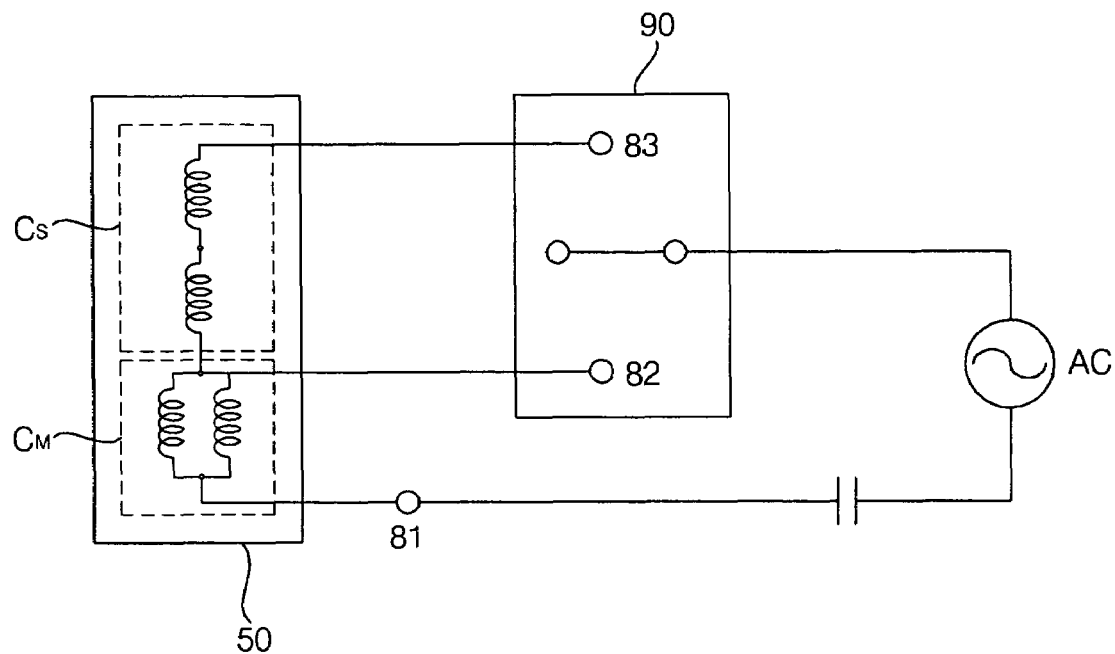
FIG. 3 is a circuit diagram of a linear motor according to the present invention.

FIG. 3 is a circuit diagram of a linear motor according to the present invention.

The linear motor according to the present invention comprises a power supply unit to apply AC power, supplied from an exterior source, to a linear motor body 50, the linear motor body 50 to perform a linear reciprocating movement upon receiving the AC power applied from the power supply unit, and a switch 90 connected between the linear motor body 50 and the power supply unit to apply the AC power from the power source to part or all of coils mounted in the linear motor body 50.

The linear motor body 50 includes a stator (not shown) and a mover (not shown). The mover is connected at a certain location thereof to a fixing portion of a piston. Thereby, if the mover is linearly reciprocated under the influence of a magnetic field produced in the stator, the piston, connected to the mover, compresses a refrigerant while being linearly reciprocated in a cylinder.

The stator of the linear motor body 50 includes an outer core in the form of a stack, an inner core in the form of a stack and inwardly spaced apart from the outer core, and a coil assembly mounted in the outer core. The coil assembly includes a plurality of coils adapted to produce a magnetic field when electric voltage is applied thereto.

The mover includes a magnet located between the outer core and the inner core and connected to the piston.

The plurality of coils of the coil assembly includes main coils Cm, and auxiliary coils Cs. The main coils Cm are connected in parallel, and the auxiliary coils Cs are connected in series.

The coil assembly further includes a ground tap 81 connected at one end thereof to first ends of the respective main coils Cm connected in parallel, the other end of the ground tap 81 being connected to a ground end of the power supply unit, a first connecting tap 82 connected to second ends of the respective main coils Cm and a first end of the auxiliary coils Cs connected in series, and a second connecting tap 83 connected to a second end of the auxiliary coils Cs.

The switch 90 is a device to allow the AC power of the power supply unit to be selectively applied to the coil assembly. The switch 90 is preferably a relay, but the present invention is not limited thereto.

When the switch 90 is connected to the first connecting tap 82, the AC power from the power supply unit is applied to the main coils Cm. Also, when the switch 90 is connected to the second connecting tap 83, the AC power is applied to the main coils Cm and the auxiliary coils Cs.

Figure 4:
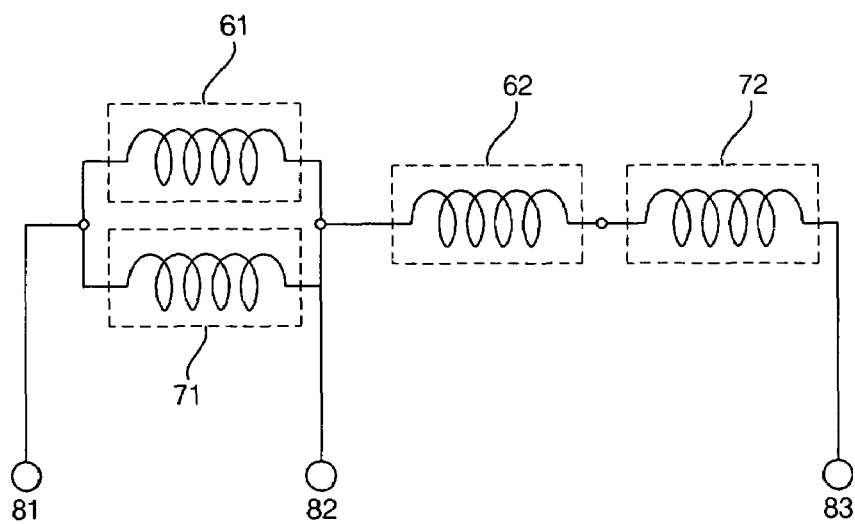
FIG. 4 is a wiring diagram illustrating wiring of coils provided in the linear motor according to the present invention.

FIG. 4 is a wiring diagram illustrating wiring of the coils provided in the linear motor according to the present invention.

In the linear motor according to the present invention, the coils of the coil assembly form a plurality of coil groups, which are formed by winding a plurality of coil conductors, respectively.

In this case, although the number of the coil groups is not limited to a specific number, for the convenience of explanation, the following description is based on the assumption that first and second coil groups are formed, each coil group being formed by winding two coil conductors.

The first coil group 60 includes a first main coil 61 and a first auxiliary coil 62, and the second coil group 70 includes a second main coil 71 and a second auxiliary coil 72. The first and second main coils 61 and 71 are connected with the first and second auxiliary coils 62 and 72 in series.

In this case, the first and second main coils 61 and 71 are connected in parallel, while the first and second auxiliary coils 62 and 72 are connected in series.

The ground tap 81, which is connected to the ground tap of the power supply unit, is connected to the first ends of the first and second main coils 61 and 71 connected in parallel. The first connecting tap 82, to which the AC power is applied, is provided between the main coils 61 and 71 and the auxiliary coils 62 and 72. When high load is applied to the linear motor or the linear compressor, the AC power is applied to the main coils 61 and 71 via the first connecting tap 82.

The first and second auxiliary coils 62 and 72 are connected in series, so that the first and second connecting taps 82 and 83 are connected to opposite ends thereof. When low load is applied to the linear motor or the linear compressor, the AC power is applied to the entire coils via the second connecting tap 83 to thereby considerably reduce the magnitude of load current.

Figure 5:
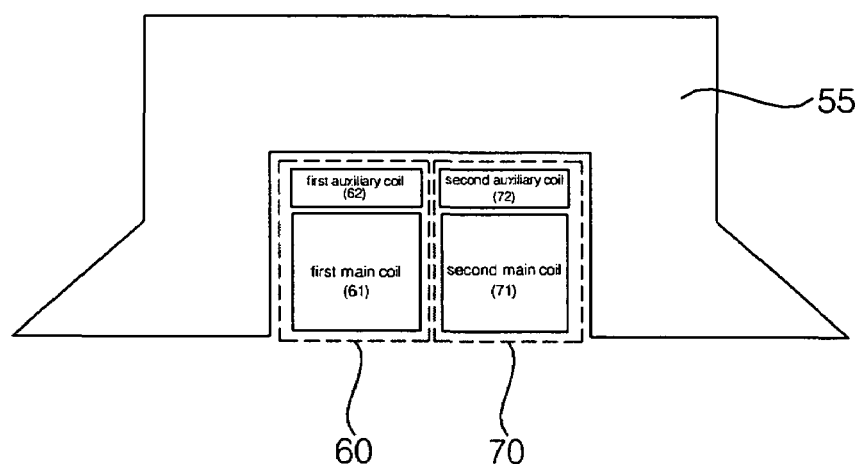
FIG. 5 is a schematic diagram illustrating a coil assembly of the linear motor according to the present invention.
Figure 6:
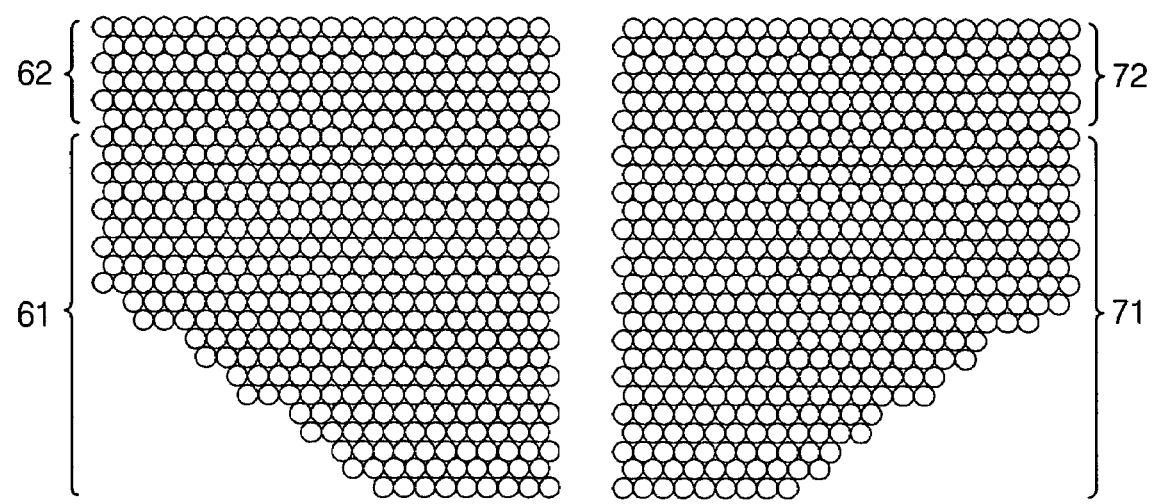
FIG. 6 is a view illustrating the winding structure of the coils provided in the linear motor according to the present invention.

FIG. 5 is a schematic diagram illustrating the coil assembly of the linear motor according to the present invention. FIG. 6 is a view illustrating the winding structure of the coils provided in the linear motor according to the present invention.

The coil assembly according to the present invention includes a bobbin, and the first and second coil groups 60 and 70 wound on the bobbin.

As can be seen from FIG. 6, the first and second coil groups 60 and 70 are wound on the bobbin in parallel to be stacked one above another. Although the respective coil conductors, that form the first and second coil groups, may have the same outer diameters as each other, preferably, the outer diameter of the coil conductor that forms the first coil group 60 is smaller or larger than that of the coil conductor that forms the second coil group 70.

Hereinafter, for the convenience of explanation, one of the coil groups, located at the left side of FIG. 5, is designated as the first coil group 60, and the other coil group, located at the right side of FIG. 5, is designated as the second coil group 70.

As stated above, each of the coil groups 60 and 70 consists of main and auxiliary coils. The main coil is disposed immediately on the bobbin, and the auxiliary coil is disposed around the main coil.

In this case, the first and second main coils 61 and 71, which are connected to each other in parallel, may be formed by twisting coil conductors of the coils 61 and 71 together.

Figure 7:
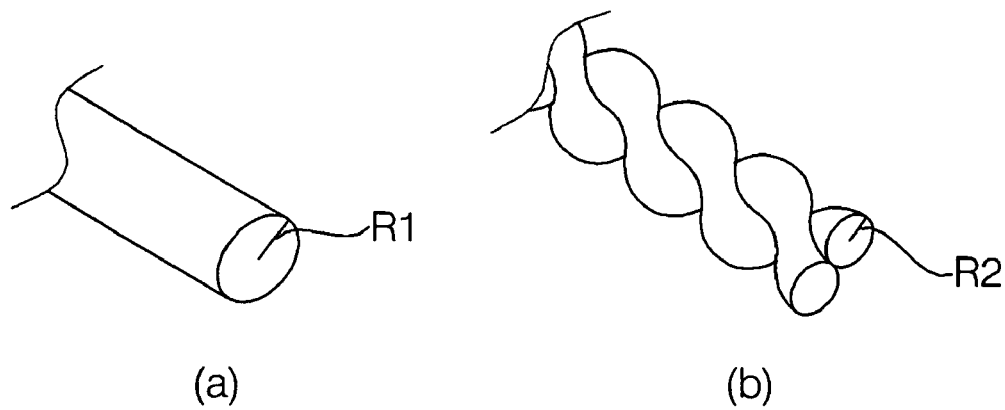
FIGS. 7a and 7b are comparative views of two coils having different cross sectional areas, FIG. 7a illustrating the coil of the conventional linear motor, FIG. 7b illustrating the coil of the linear motor according to the present invention.

FIGS. 7a and 7b are comparative views of two coils having different cross sectional areas, FIG. 7a illustrating the coil of the conventional linear motor, FIG. 7b illustrating the coil of the linear motor according to the present invention.

In the linear motor and the linear compressor using the same, the coil assembly is formed by connecting the plurality of coil conductors, having a smaller outer diameter than that of the conventional coil conductor, in series or in parallel.

As stated above, when the linear motor operates in the power mode, the AC power is applied to the coils connected in parallel. Thus, when the respective coil conductors have a radius R2 as shown in FIG. 7b, the sum of the radii R2 of the coil conductors is equal to the radius of the twisted coils. As will be easily understood by comparing FIGS. 7a and 7b, the sum of the radii R2 of the respective coils is similar to a radius R1 of the conventional coil. In this way, the cross sectional area of the coil conductors, i.e. the capacity of the coils, increases to suit the high-load power mode.

Also, when the linear motor operates in the save mode, the AC power is applied to all of the main coils connected in parallel and the auxiliary coils connected in series. Also, the main coils and the auxiliary coils of the coil groups are connected in series. With this connection structure, the capacity of the coils, to which the AC power is applied, decreases to suit the low-load save mode.

With the present invention, therefore, even if coils are formed by winding coil conductors having small cross sectional areas, there is no loss in the efficiency of the linear motor.

Figure 8:
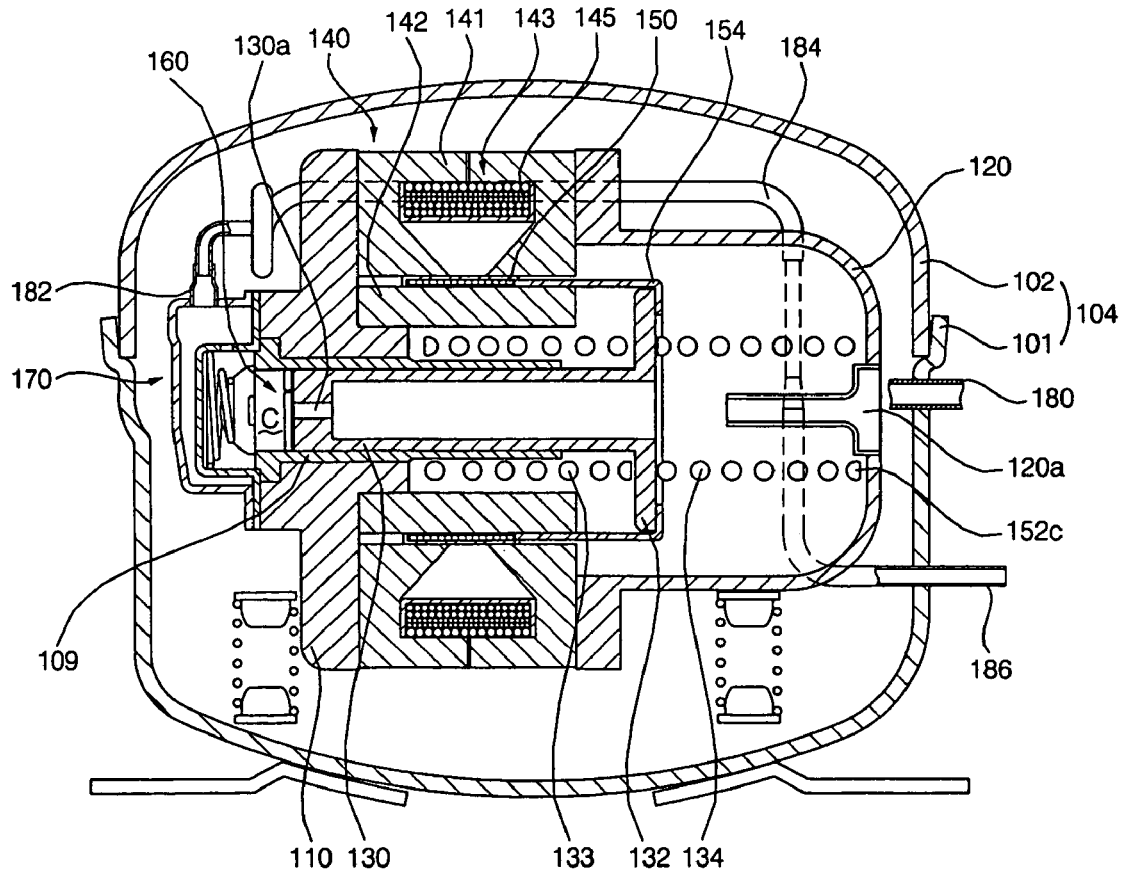
FIG. 8 is a sectional view illustrating the interior configuration of a linear compressor having the linear motor according to the present invention.

Now, the configuration of a linear compressor, in which the linear motor configured and operated as stated above is mounted, will be explained. FIG. 8 is a sectional view illustrating the interior configuration of the linear compressor having the linear motor according to the present invention.

The linear compressor comprises a hermetic container 104 including a lower container 101 having an open upper surface, and an upper cover 102 configured to cover the lower container 101.

A cylinder block 110 having a cylinder 109 is mounted in the hermetic container 104 in a shock-absorbing manner. Also, a back cover 120 having a refrigerant suction channel 120a is supported relative to the cylinder block 110 in a shock-absorbing manner.

Here, the back cover 120 is spaced apart from the cylinder block 110.

The linear compressor further comprises a piston 130, a linear motor 140, a suction valve 160, and a discharge valve 170. The piston 130 is located to be linearly reciprocated in the cylinder 109, and is internally formed with a refrigerant passage 130a to guide the refrigerant, introduced from the refrigerant suction channel 120a, into the cylinder 109. The linear motor 140 is connected to the piston 130 to linearly reciprocate the piston 130. The suction valve 160 is mounted to the piston 130 and is operated by the gaseous refrigerant to open or close the refrigerant passage 130a. The discharge valve 170 is mounted to the cylinder block 110 so that a compression chamber C is defined in the cylinder 109 between the discharge valve 170 and the piston 130. The discharge valve 170 is also operated by the gaseous refrigerant to open or close the cylinder 109.

The piston 130 has a radially protruding fixing portion 132 formed at one end thereof so that the linear motor 140 is connected to the fixing portion 132. The piston 130 is supported in a shock-absorbing manner between the cylinder block 110 and the back cover 120 by means of first and second springs 133 and 134. The first spring 133 is interposed between one surface of the fixing portion 132 and the cylinder block 110, and the second spring 134 is interposed between the other surface of the fixing portion 132 and the back cover 120.

The linear motor 140 includes a stator and a mover. The fixing portion 132 of the piston 130 is coupled to a certain location of the mover. Thereby, if the mover is linearly reciprocated by a magnetic force produced in the stator, the piston 130 is linearly reciprocated in the cylinder 109.

The stator includes an outer core 141 in the form of a stack, an inner core 142 in the form of a stack and spaced apart from the outer core 141, and a coil assembly 143 mounted in the outer core 141. The configuration of the coil assembly 143 has been explained hereinbefore in detail in connection with the linear motor.

The outer core 141 is disposed at facing surfaces of both the cylinder block 110 and the back cover 120, and is coupled thereto by means of fastening members, etc.

The inner core 142 is coupled to the cylinder block 110 by means of fastening members.

The mover includes a magnet 150 located between the outer core 141 and the inner core 142, and a magnet frame 154 disposed between the outer core 141 and the inner core 142 to be linearly reciprocated. The magnet frame 154 is connected to both the magnet 150 and the piston 130.

The discharge valve 170 and the suction valve 160 operate according to the linear reciprocating movement of the piston 130 to introduce the gaseous refrigerant inside the hermetic container 104 into the compression chamber C and to discharge the compressed refrigerant from the compression chamber C.

Reference numeral 180 denotes a suction pipe connected to a certain location of the hermetic container 104 to introduce exterior refrigerant into the hermetic container 104, reference numeral 182 denotes a discharge valve pipe connected to the discharge valve 170, reference numeral 184 denotes a loop pipe having a first end connected to the discharge pipe 182, and reference numeral 186 denotes a discharge pipe having a first end connected to a second end of the loop pipe 184 and a second end to penetrate through the hermetic container 104 to thereby protrude out of the hermetic container 104.

Hereinafter, the operation of the linear motor and the linear compressor using the same according to the present invention will be explained.

When high load is applied thereto, the linear motor and the linear compressor using the same according to the present invention operate in the power mode, and the relay 90 is connected to the first connecting tap 82 that is connected to the second ends of the first and second main coils 61 and 71 and the first end of the auxiliary coils 62 and 72.

If the first connecting tap 72 is connected to the relay 90, the AC power, from the power supply unit that is connected to the end of the relay 90, is supplied to the respective first and second main coils 61 and 71. In this case, since the first and second main coils 61 and 71 are connected in parallel, the supplied AC power is equally applied to the respective first and second main coils 61 and 71.

As a result of supplying the AC power to the respective first and second main coils 61 and 71, the value of electric current flowing through the respective coils increases. Thereby, the coils produce a high strength of magnetic field therearound, allowing the magnet 150 to be linearly reciprocated with a lengthened stroke.

Then, the linear reciprocating movement of the magnet 150 is transmitted to the piston 130 via the magnet frame 154, whereby the piston 130 operates to compress the gaseous refrigerant in the compression chamber C while being linearly reciprocated in the cylinder 109.

Meanwhile, when low load is applied thereto, the linear motor and the linear compressor operate in the save mode, and the relay 90 is connected to the second connecting tap 83. Since the second connecting tap 73 is connected to the second end of the first and second auxiliary coils 62 and 72 that are connected in series, both the auxiliary coils 62 and 72 are connected to the relay 90 in series. Thereby, the AC power is applied to the entire coil groups including the auxiliary coils 62 and 72 connected in series and the main coils 61 and 71 connected in parallel.

Since the main coils 61 and 71 are connected to the auxiliary coils 62 and 72 in series, if the AC power is applied to the entire coil groups, the AC power is distributed to the respective coils depending on the capacity of the respective coils. In particular, in the case of the first and second auxiliary coils 62 and 72, since they are connected in series, the supplied AC power is divided to be applied to the main coils 61 and 71, the first auxiliary coil 62, and the second auxiliary coil 72, respectively.

Therefore, the electric current flowing through the respective coils has a small value, and consequently, the coils produce a low strength magnetic field therearound, allowing the magnet 150 to be linearly reciprocated with a shortened stroke.

As is apparent from the above description, the present invention provides a linear compressor having the following effects.

Firstly, according to the present invention, a plurality of coil conductors are wound to form a plurality of coil groups and the plurality of coil groups are connected in series or in parallel, so that the capacity of the coils is variable depending on a load applied to the linear motor. This effectively improves the efficiency of the linear motor.

Secondly, according to the present invention, the coils having a small outer diameter are connected in parallel to achieve the same effect as that achieved by a coil having a large cross sectional area. This improves the efficiency of the motor with a reduced motor size, thereby preventing resource consumption of electricity and reducing manufacturing costs of the linear motor and the linear compressor.

Thirdly, using the small diameter coils enables easy alignment and winding of the coils, resulting in simplified manufacturing process of the linear motor and the linear compressor using the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear motor comprising:
a bobbin;
first and second coil groups wound on the bobbin to allow driving power to be applied to the coil groups; and
a magnet adapted to be linearly reciprocated under the influence of a magnetic field that is produced by the coil groups depending on load current flowing through the coil groups,
wherein each of the coil groups comprises a main coil and an auxiliary coil, and the main coils are connected with each other in parallel,
wherein the first coil group has a first main coil and a first auxiliary coil, and the second coil group has a second main coil and a second auxiliary coil,
wherein a base tap is connected to first ends of the first and second main coils connected in parallel, the base tap being connected to a power supply unit,
where a first connecting tap is connected to second ends of the first and second main coils connected in parallel and a first end of the first and second auxiliary coils connected in series, and
wherein a second connecting tap is connected to a second end of the first and second auxiliary coils connected in series.

2. The linear motor as set forth in claim 1, wherein each of the first and second coil groups each consists of one or more coils stacked one above another on the bobbin.

3. The linear motor as set forth in claim 2, wherein the first and second coil groups are formed of first and second coil conductors, respectively, the first coil conductor having a different outer diameter from that of the second coil conductor.

4. The linear motor as set forth in claim 3, wherein the outer diameter of the first coil conductor of the first coil group is smaller than that of the second coil conductor of the second coil group.

5. The linear motor as set forth in claim 1, wherein the first and second main coils are immediately disposed on the bobbin, and the first and second auxiliary coils are disposed on the first and second main coils.

6. The linear motor as set forth in claim 5, wherein the first and second main coils are twisted together prior to being wound on the bobbin.

7. The linear motor as set forth in claim 1, further comprising:
   a switch connected to part or all of the coil groups to apply the driving power thereto depending on the magnitude of load applied to the motor.

8. The linear motor as set forth in claim 7, wherein the switch is a relay.

9. The linear motor as set forth in claim 7, wherein:
   when the applied load is high, the switch is connected to the first connecting tap to apply the driving power to the first and second main coils; and
   when the applied load is low, the switch is connected to the second connecting tap to apply the driving power to all the first and second main coils and the first and second auxiliary coils.

10. The linear motor as set forth in claim 1, wherein the main coils are positioned to be adjacent to each other in a right-left direction of the bobbin.

\* \* \* \* \*